US011623999B2

(12) United States Patent
Sun et al.

(10) Patent No.: US 11,623,999 B2
(45) Date of Patent: Apr. 11, 2023

(54) METHOD FOR PREPARING FLUORESCENT POLARIZING FILM BASED ON DIRECTIONAL ARRANGEMENT OF QUANTUM RODS

(71) Applicant: SOUTH UNIVERSITY OF SCIENCE AND TECHNOLOGY OF CHINA, Shenzhen (CN)

(72) Inventors: Xiaowei Sun, Shenzhen (CN); Kai Wang, Shenzhen (CN); Haochen Liu, Shenzhen (CN); Ziming Zhou, Shenzhen (CN); Zhe Zhang, Shenzhen (CN); Junjie Hao, Shenzhen (CN); Zuoliang Wen, Shenzhen (CN)

(73) Assignee: SOUTH UNIVERSITY OF SCIENCE AND TECHNOLOGY OF CHINA, Shenzhen (CN)

( * ) Notice: Subject to any disclaimer, the term of this patent is extended or adjusted under 35 U.S.C. 154(b) by 65 days.

(21) Appl. No.: 16/641,330

(22) PCT Filed: Sep. 13, 2017

(86) PCT No.: PCT/CN2017/101505
§ 371 (c)(1),
(2) Date: Feb. 24, 2020

(87) PCT Pub. No.: WO2019/037163
PCT Pub. Date: Feb. 28, 2019

(65) Prior Publication Data
US 2020/0224049 A1  Jul. 16, 2020

(30) Foreign Application Priority Data
Aug. 23, 2017 (CN) .......................... 201710729088.4

(51) Int. Cl.
*B41J 2/17* (2006.01)
*B41J 2/155* (2006.01)
(Continued)

(52) U.S. Cl.
CPC ............... *C09D 11/38* (2013.01); *B41J 2/155* (2013.01); *B41J 2/17* (2013.01); *B41M 1/30* (2013.01);
(Continued)

(58) Field of Classification Search
None
See application file for complete search history.

(56) References Cited

U.S. PATENT DOCUMENTS 8,920,766 B2 * 12/2014 Krauss ............... G01N 21/6486
423/508
10,603,885 B2 * 3/2020 Iwase ........................ B32B 7/12
(Continued)

FOREIGN PATENT DOCUMENTS

CN  101497428 A  8/2009
CN  103741229 A  4/2014
(Continued)

OTHER PUBLICATIONS

International Search Report and Written Opinion Form PCT/ISA/210 and PCT/ISA237, International Application No. PCT/CN2017/101505, pp. 1-8, International Filing Date Sep. 13, 2017, dated May 9, 2018.
(Continued)

*Primary Examiner* — Alejandro Valencia
(74) *Attorney, Agent, or Firm* — George McGuire

(57) ABSTRACT

A method for preparing a fluorescent polarizing film based on directional arrangement of quantum rods. In the method, an inkjet printing technology is used for printing quantum-rod ink having proper viscosity and surface tension on a
(Continued)

substrate according to a preset pattern, and directionally arranging quantum rods to obtain a fluorescent polarizing film. The diameter and spacing of fluorescent lines obtained by the method can be controlled and adjusted according to parameter conditions such as a needle aperture, a printing speed, and a preset pattern. The prepared transparent fluorescent film with directionally arranged quantum rods has a high degree of polarization, can be prepared on a flexible substrate in a normal temperature environment, and has wide applicability.

19 Claims, 6 Drawing Sheets

(51) Int. Cl.
| | | |
|---|---|---|
| *C09D 11/38* | (2014.01) | |
| *B41M 1/30* | (2006.01) | |
| *B82Y 20/00* | (2011.01) | |
| *B82Y 30/00* | (2011.01) | |
| *C09K 11/56* | (2006.01) | |
| *C09K 11/88* | (2006.01) | |

(52) U.S. Cl.
CPC .............. *B82Y 20/00* (2013.01); *B82Y 30/00* (2013.01); *C09K 11/562* (2013.01); *C09K 11/883* (2013.01)

(56) References Cited

U.S. PATENT DOCUMENTS

| | | | |
|---|---|---|---|
| 2003/0049863 A1* | 3/2003 | Woodward | B01L 3/0262 436/180 |
| 2012/0201265 A1 | 8/2012 | Krahne et al. | |
| 2016/0070136 A1* | 3/2016 | Jang | G02F 1/133514 349/61 |
| 2016/0194507 A1 | 7/2016 | Gresty et al. | |
| 2016/0218287 A1* | 7/2016 | McAlpine | B33Y 30/00 |
| 2017/0123128 A1 | 5/2017 | Wu et al. | |
| 2019/0129252 A1* | 5/2019 | Srivastava | G02F 1/133609 |

FOREIGN PATENT DOCUMENTS

| | | |
|---|---|---|
| CN | 104064658 A | 9/2014 |
| CN | 104991374 A | 10/2015 |
| CN | 105403945 A | 3/2016 |
| CN | 105694590 A | 6/2016 |
| CN | 106283398 A | 1/2017 |
| CN | 106654028 A | 5/2017 |
| CN | 107065308 A | 8/2017 |
| KR | 20140096887 A | 8/2014 |
| WO | 2016009431 A1 | 1/2016 |

OTHER PUBLICATIONS

"3D-Printing of Lightweight Cellular Composites" Brett G. Compton and Jennifer A. Lewis, pp. 5930-5935.

* cited by examiner

METHOD FOR PREPARING FLUORESCENT POLARIZING FILM BASED ON DIRECTIONAL ARRANGEMENT OF QUANTUM RODS

CROSS REFERENCE TO RELATED APPLICATIONS

This is a U.S. National Stage Application, filed under 35 U.S.C. 371, of International Patent Application No. PCT Application No. PCT/CN2017/101505 filed on Sep. 13, 2017, which claims priority to Chinese patent application No. 201710729088.4, filed on Aug. 23, 2017, the contents of each of which are incorporated herein by reference in their entireties.

TECHNICAL FIELD

The present disclosure belongs to the technical field of photoelectric material preparation, and relates to a method for directionally arranging quantum rods, for example, a method for preparing a fluorescent polarizing film based on directional arrangement of quantum rods.

BACKGROUND

At present, there are many studies on the polarization performance of quantum rods. However, most of these studies are for the analysis of quantum rods of single particles, and there is little analysis about the polarization of quantum rods in a large amount under a combined action. Because the polarization effect of a quantum rod is along the axial direction of the rod-shaped material. In the case where a large number of quantum rods are freely distributed, a good polarization performance cannot be exhibited integrally. Quantum rods can emit polarized light effectively only when they are arranged in order.

At present, ordered one-dimensional nanowires can be produced by techniques such as template method, self-assembly method, electric field induction, magnetic field induction, chemical/biological molecule affinity assembly, magnetic dipole selection, imprint transfer, etching, electrospinning, etc. Each of these methods has its advantages and disadvantages, and many of them are high-cost and difficult to perform. For instance, the electric field induction method needs a large electric field to be applied, which imposes severe requirements on the experimental conditions; the imprint transfer method and etching method have pretty high requirements on transfer process and template precision; and the etching method would destroy a certain surface morphology.

CN 101497428A discloses a method for arranging a nanowire array by electrospinning, which comprises the steps of: using directionally spun nanofibers as a template, uniformly scraping a semiconductor nanowire solution dripped on the nanofibers by using a blade, then adding a drop of lubricant on a substrate, and dragging the spun fibers to move left and right on the substrate by using a mechanical arm so as to realize the successful transfer of the semiconductor nanowires adsorbed on the fibers toward the substrate. In this invention, the directionally spun nanofiber is required to serve as a template, and the semiconductor nanowire solution dripped on the nanofiber is scraped uniformly by a blade, thus the problems including poor uniformity of a film can be caused.

CN 103741229A discloses a preparation method of directionally arranged electrospun nanofibers, which comprises the following steps: folding the metal collecting sheet, then cleaning, and putting it into a drying box for later use; preparing a high polymer solution as an electrospinning solution; injecting the prepared electrospinning solution into an electrospinning device; taking the prepared folded metal collecting sheet as a collecting plate, starting the electrospinning device, collecting directionally arranged electrospun nanofibers on the metal collecting sheet under the action of an external electric field with the voltage of 10-20 KV and under the condition that the collecting distance is 10-30 cm, and adjusting the direction of the metal collecting sheet to obtain the nanofibers with a required shape.

Therefore, it can be seen that although the electrospinning can realize the directional arrangement of nano materials, certain carrier is needed for assistance. There are not many existing methods for directionally arranging quantum rod materials. For example, a mechanical stretching method has been used to obtain a quantum rod film material, which method, however, has a large material loss and a limited directional effect.

It is desirable in the art to develop a new method that enables the directional arrangement of quantum rod materials.

SUMMARY

The following is a brief summary of the subject matter that will be described in greater detail herein. The summary is not intended to be limiting as to the protection scope of the claims.

The purpose of the present disclosure is to provide a method for preparing a fluorescence polarizing film based on directional arrangement of quantum rods. The method enables to directionally arrange quantum rods, and to obtain a fluorescent film having high polarization performance.

For the purpose, the present disclosure adopts the following technical solutions:

The purpose of the present disclosure is to provide a method for preparing a fluorescent polarizing film based on directional arrangement of quantum rods, wherein quantum rods are directionally arranged to prepare a fluorescence film having polarization performance, the method comprising the steps of:

a quantum-rod ink is printed on a substrate according to a preset pattern by using an ink-jet printing method to obtain a fluorescent film with quantum rods being arranged directionally.

In the present disclosure, the quantum rod material film is prepared by using an ink-jet printing method which is a simple and efficient method, the line diameter and the line spacing of the quantum rods in the obtained quantum rod film can be controlled and adjusted, and the transparent fluorescent polarizing film with high polarization performance can be prepared on a flexible substrate at normal temperature by directionally arranging the quantum rods.

In the present disclosure, the quantum-rod ink with proper viscosity and surface tension can be prepared according to the actual application condition so as to realize the purpose of printing the quantum rod films on different substrates.

Preferably, the quantum rods of the quantum-rod ink may be any one selected from the group consisting of red quantum rods, green quantum rods and blue quantum rods, or a combination of at least two selected therefrom.

Preferably, the quantum rod material for preparing the quantum-rod ink is a single-core material and/or a core-shell coated material, preferably a core-shell coated material.

Preferably, the single-core material is any one selected from the group consisting of CdSe (cadmium selenide), CdTe (cadmium telluride), CdS (cadmium sulfide), ZnSe (zinc selenide), CuInS (copper indium sulfide), InP (indium phosphide), CuZnSe (copper zinc selenide) and ZnMnSe (zinc manganese selenide), or a combination of at least two selected therefrom, and typical but non-limiting examples of the combinations include: a combination of CdSe and CdTe, a combination of CdS and ZnSe, a combination of CdTe and CuInS, a combination of InP and CuZnSe, a combination of CuZnSe and ZnMnSe, a combination of CdSe, CdTe and CdS, a combination of ZnSe, CdTe and CuInS, a combination of InP, CuZnSe and ZnMnSe, a combination of CdSe, CdTe, CdS, ZnSe and CdTe, and the like, preferably CdSe.

Preferably, the core-shell coated material has the single-core material as a core thereof, and a shell layer material selected from the group consisting of CdS (cadmium sulfide), ZnO (zinc oxide), ZnS (zinc sulfide), ZnSe (zinc selenide) and ZnTe (zinc telluride), or a combination of at least two selected therefrom, and typical but non-limiting examples of the combinations include: a combination of CdS and ZnO, a combination of ZnS and ZnSe, a combination of ZnSe and ZnTe, a combination of CdS, ZnO and ZnS, a combination of CdS, ZnO, ZnS, ZnSe and ZnTe, and the like, preferably CdS.

As a preferred technical solution of the present disclosure, the quantum rods are CdSe/CdS quantum rods prepared from a core-shell coated material having CdSe as a core and CdS as a shell material.

In the present disclosure, the preparation method of the quantum-rod or nanowire inks other than the CdSe/CdS quantum-rod ink is the method described in the conventional prior art, and therefore will not be described herein.

As a preferred technical solution of the present disclosure, the preparation method of the CdSe/CdS quantum-rod ink comprises the following steps:

(a) cadmium oxide (CdO), a solvent and n-hexyl phosphonic acid (HPA) are mixed, heated to a first temperature, and subjected to operation of vacuuming and replacing the atmosphere by argon gas for removal of water and oxygen, then heated to a second temperature and stirred until CdO is completely dissolved to be transparent, and tri-n-octylphosphine (TOP) is added, then a Se-TOP precursor solution is added for reaction, and the mixture is cooled to obtain a CdSe core solution;

(b) the CdSe core solution obtained in step (a) is purified and dispersed into TOP to form a CdSe-TOP solution;

(c) CdO, a solvent, HPA and tetradecyl phosphonic acid (TDPA) are mixed, heated to a first temperature, and subjected to operation of vacuuming and replacing the atmosphere by argon gas for removal of water and oxygen, then heated to a second temperature and stirred until CdO is completely dissolved to be transparent, and TOP is added, then a S-TOP solution and the CdSe-TOP solution obtained in step (b) are added for reaction, and the mixture is cooled to obtain a CdSe/CdS quantum rod solution;

(d) the CdSe/CdS quantum rod solution is purified, a solvent and an additive are added, and a quantum-rod ink with proper viscosity and surface tension is prepared according to actual application conditions.

Wherein, the reaction time in step (a) is adjusted according to the desired emission wavelength. Preferably, the reaction time in step (a) is 5-25 s, e.g. 5 s, 7 s, 9 s, 10 s, 15 s, 17 s, 20 s, or 25 s, preferably 20 s.

Preferably, the preparation method of the Se-TOP solution in step (a) comprises the steps that: Se powder is dissolved in TOP, heated and stirred until the solution is in a transparent state, so that the Se-TOP solution is prepared.

Preferably, the preparation method of the S-TOP solution in step (c) comprises the steps that: S powder is dissolved in TOP, heated and stirred until the solution is in a transparent state, so that the S-TOP solution is prepared.

Preferably, the mass ratio of CdO to HPA in step (a) is 1:2-1:6, e.g. 1:2, 1:2.5, 1:2.8, 1:3, 1:3.5, 1:4, 1:4.3, 1:4.8, 1:5, 1:5.5 or 1:6, preferably 1:4.3.

Preferably, the solvent in step (a) and step (c) is tri-n-octylphosphine oxide (TOPO).

Preferably, in step (a) and step (c), the first temperature is 70° C.-150° C., and the second temperature is 280° C.-330° C., but not limited to the numerical values recited herein, and other numerical values within this numerical range which are not recited herein are equally applicable.

Preferably, the reaction time in step (c) is 5-15 min, e.g. 5 min, 7 min, 9 min, 10 min, 11 min, 12 min, 13 min, 14 min or 15 min, preferably 8 min.

Preferably, the solvent in step (d) is any one selected from the group consisting of toluene, o-dichlorobenzene, dimethylacetamide, 3,4-dimethylanisole, chloroform, chlorobenzene, xylene, benzene, n-hexane, cyclohexane, n-heptane, octane, decane, undecane, dodecane, n-tetradecane, hexadecane and n-octadecane, or a combination of at least two selected therefrom; preferably toluene.

Preferably, the additive in step (d) is any one selected from the group consisting of an adhesive, a surfactant, a defoaming agent and a humectant, or a combination of at least two selected therefrom.

Preferably, the quantum-rod ink has a concentration of 0.2-2000 mg/mL, e.g. 0.2 mg/mL, 0.5 mg/mL, 1 mg/mL, 3 mg/mL, 5 mg/mL, 8 mg/mL, 10 mg/mL, 12 mg/mL, 15 mg/mL, 18 mg/mL, 20 mg/mL, 23 mg/mL, 25 mg/mL, 28 mg/mL, 30 mg/mL, 32 mg/mL, 35 mg/mL, 38 mg/mL, 40 mg/mL, 60 mg/mL, 80 mg/mL, 100 mg/mL, 300 mg/mL, 500 mg/mL, 800 mg/mL, 1000 mg/mL, 1500 mg/mL, or 2000 mg/mL.

Preferably, the solvent of the quantum-rod ink is any one selected from the group consisting of toluene, o-dichlorobenzene, dimethylacetamide, 3,4-dimethylanisole, chloroform, chlorobenzene, xylene, benzene, n-hexane, cyclohexane, n-heptane, octane, decane, undecane, dodecane, n-tetradecane, hexadecane and n-octadecane, or a combination of at least two selected therefrom; preferably toluene or a mixture of toluene and o-dichlorobenzene.

Preferably, the quantum-rod ink further comprises an additive.

Preferably, the additive is any one selected from the group consisting of an adhesive, a surfactant, a defoaming agent and a humectant, or a combination of at least two selected therefrom.

Preferably, the concentration of the additive in the quantum-rod ink is 0-50%, e.g. 0%, 1%, 3%, 5%, 10%, 15%, 20%, 25%, 30%, 35%, 40%, 45% or 50%.

Preferably, before printing, the quantum-rod ink is injected into a solution tray, an ink-jet printing needle is immersed into the quantum-rod ink in the solution tray, and the solution is sucked by the needle into the needle.

Preferably, during printing, the upper left corner of the substrate is selected as the origin of coordinates, the needle is moved to the lower part of the printer by moving the mechanical arm of the printer, then the needle is lowered until it contacts the surface of the printing substrate, a preset printing pattern is introduced, and printing is performed on the substrate according to the preset printing pattern.

The present disclosure utilizes ink-jet printing, allows the needle to absorb the solution to be printed through capillary phenomenon, and after the solution fills up the needle automatically, through the adjustment of coordinate, the mechanical arm of the printer is allowed to move to the position to be printed according to the desktop coordinate, and to slightly descend to the printing point on the position; after adjusting the printing voltage, the array printing with high accuracy is carried out by introducing the printing pattern. The ink-jet printer needle would continuously jet the quantum-rod ink, and after the fluid flows on the substrate in a certain direction, there will be the action of fluid force and surface tension, which allows the quantum rods arranged along the printing direction.

Preferably, the substrate is any one selected from the group consisting of a common glass, an ITO conductive glass and a polymer substrate or a device.

Preferably, the polymer substrate is a PET (polyethylene terephthalate) substrate, a PEN (polyethylene naphthalate) substrate, or a PMMA (polymethyl methacrylate) substrate.

Preferably, the needle has a bore diameter of 0.05 mm-100 mm, e.g. 0.05 mm, 1 mm, 3 mm, 5 mm, 8 mm, 10 mm, 20 mm, 30 mm, 40 mm, 60 mm, 80 mm or 100 mm.

Preferably, the printing line in the preset pattern has a width greater than or equal to the bore diameter of the printing needle.

Preferably, the print line spacing is 0-200 mm, e.g. 0 mm, 2 mm, 5 mm, 8 mm, 10 mm, 20 mm, 50 mm, 80 mm, 100 mm, 120 mm, 140 mm, 160 mm, 180 mm or 200 mm.

The ink-jet printing method of the present disclosure enables directional arrangement of quantum rods so as to obtain a fluorescent polarizing film, and can also obtain quantum rod films with various specifications and various polarizations more flexibly depending on the adjustment of parameters such as the needle size in a printer, the printing speed, the frequency of the needle and the printing line width.

Preferably, the lowering speed during lowering the needle is 1-5 μm/s, e.g. 1 μm/s, 1.5 μm/s, 2 μm/s, 2.5 μm/s, 3 μm/s, 3.5 μm/s, 4 μm/s, 4.5 μm/s or 5 μm/s.

Preferably, the printing speed of the needle during printing is above 5 μm/s, e.g. 5 μm/s, 8 μm/s, 10 μm/s, 15 μm/s, 20 μm/s, 30 μm/s, 40 μm/s, 50 μm/s, 60 μm/s, 80 μm/s, 100 μm/s, 200 μm/s, 400 μm/s, 600 μm/s, 800 μm/s, 1000 μm/s, 3000 μm/s, 5000 μm/s, 8000 μm/s, 1 cm/s, 3 cm/s, 5 cm/s or 8 cm/s, preferably 5 μm/s-1 cm/s.

Preferably, the frequency of the needle during printing is 1.4-2.1 KHz, e.g. 1.4 KHz, 1.5 KHz, 1.6 KHz, 1.7 KHz, 1.8 KHz, 1.9 KHz, 2.0 KHz or 2.1 KHz.

Preferably, the printing voltage during printing is 0.1-18 V, e.g. 0.1 V, 0.2 V, 0.4 V, 0.6V, 0.8V, 1 V, 2 V, 4 V, 6V, 8V, 10V, 12V, 14 V, 16V or 18V.

Preferably, when printing, the mechanical arm drives the needle to do linear motion according to the pattern. Templates in a linear parallel arrangement may be selected in the present disclosure.

The present disclosure utilizes the ink-jet printing technology to print the directionally arranged quantum rods, thus can obtain the line width with a diameter of hundreds of microns to several microns, and form a uniform film through combination of the line widths. The method is a simple, efficient and versatile method for directionally arranging quantum rods, and thereby has a polarization effect in relatively high proportion, and the polarizing film prepared by the ink-jet printing technology has large specific surface area and uniform line diameter.

The collection mode of the flat substrate is adopted in the present disclosure. In the presence of flat glass or materials such as PET and PEN, the conditions such as high temperature and high vacuum are not required. Printing is carried out by using ink-jet printing with high precision and line printing, wherein high-polarization film is formed through combination of lines, and various degrees of arrangement can be obtained by adjusting the size of the printer needle and the printing precision. Such a technology provides a good solution for the preparation of display devices based on quantum dots and the preparation of light-emitting devices with high polarization rate in the future.

The method of the present disclosure is applicable to ink-jet printing of a plurality of liquid materials. For example, as for nano-particles having specific morphology such as quantum rods, quantum dots and perovskite nanowires, it can operate at normal temperature, and has wide applicability.

As compared to the existing technologies, the present disclosure has the following beneficial effects:

The present disclosure first proposes to prepare the quantum rod material film by using an ink-jet printing method which is a simple and efficient method; the line diameter and the line spacing of the quantum rods in the obtained quantum rod film can be controlled and adjusted; and the transparent fluorescent polarizing film can be prepared on a flexible substrate at normal temperature by directionally arranging quantum rods. The present disclosure is applicable to a plurality of nano-particle materials having specific morphology such as quantum rods, quantum dots and perovskite nanowires, and use simple experimental device, is easy operation and has wide applicability.

DETAILED DESCRIPTION

The technical solution of the present disclosure is further explained by the following specific embodiments. It should be apparent to those skilled in the art that the examples are only to aid in understanding the present disclosure and should not be construed as specific limitations to the present disclosure.

Example 1

Figure 3:
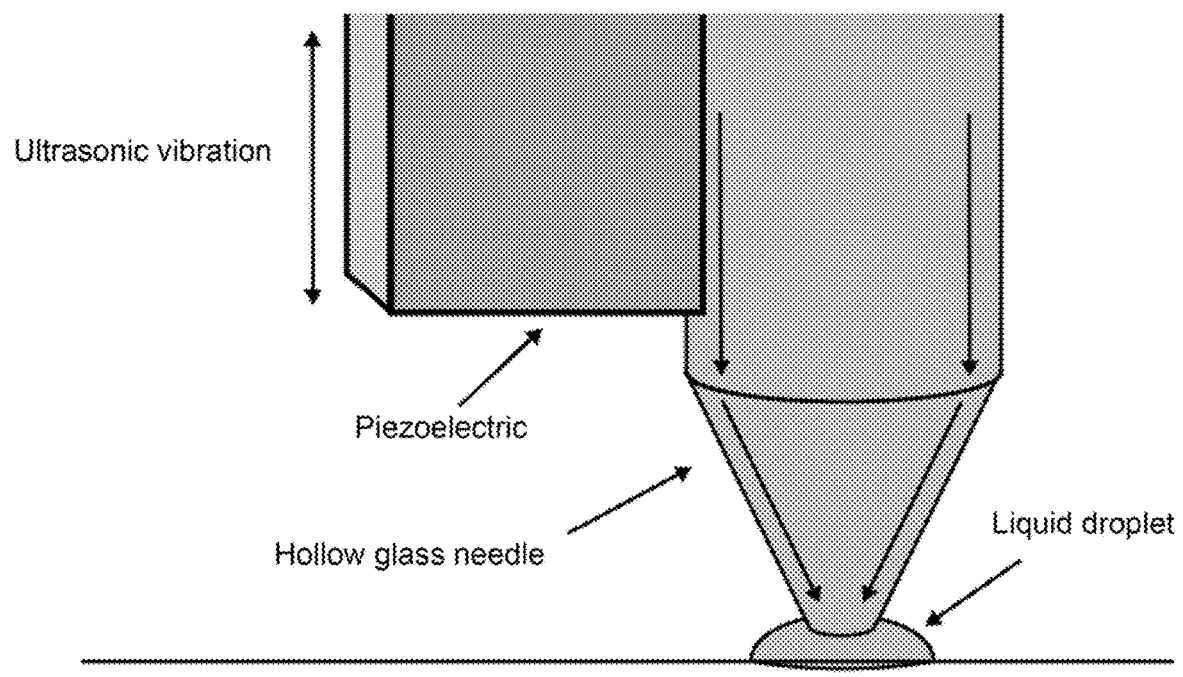
FIG. 3 is an enlarged schematic view of the structure of the needle portion of a printer used in the present disclosure.
Figure 4:
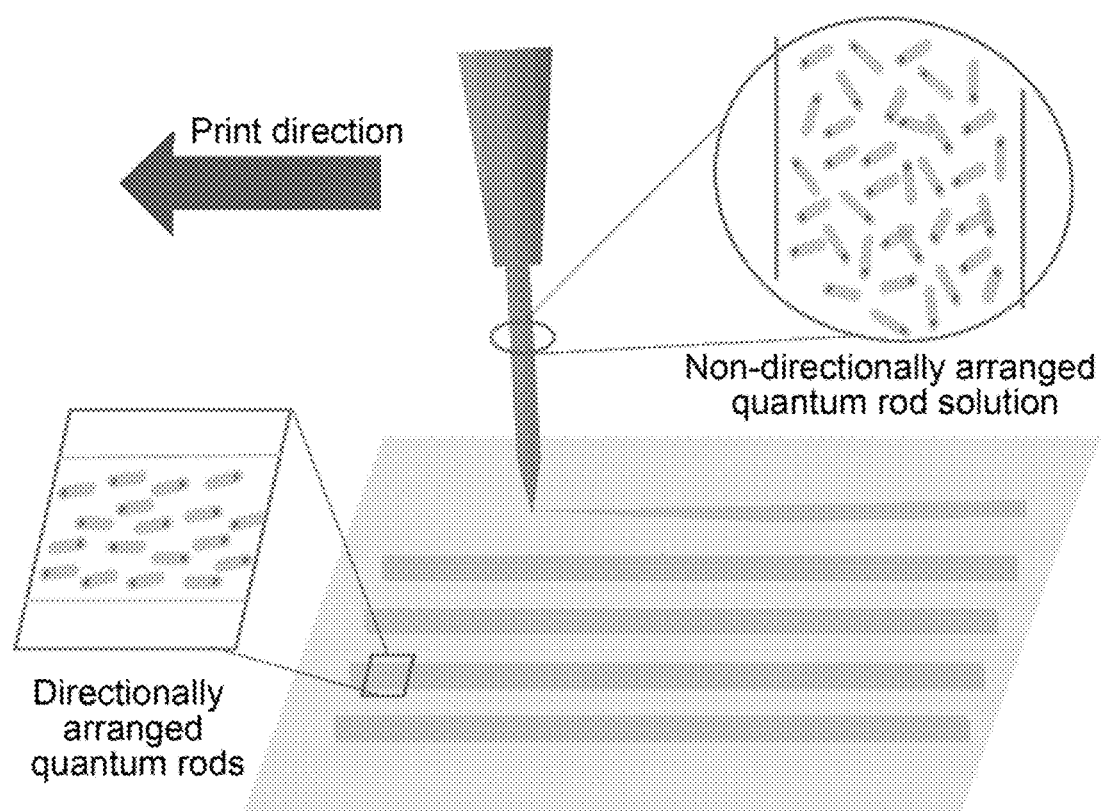
FIG. 4 is a schematic view showing the printing of an ink-jet printer on a substrate according to the present disclosure.

In this example, a directionally arranged quantum rod film was prepared by the following method, which specifically comprises the following steps:

CdSe/CdS as a quantum rod material was prepared into a quantum-rod ink by using toluene as a solvent, wherein the concentration of the quantum-rod ink was 20 mg/mL; the quantum-rod ink was injected into a solution tray, an ink-jet printing needle was immersed into the quantum-rod ink in the solution tray, and the solution was sucked by the needle into the needle; the upper left corner of the common glass substrate was selected as the origin of coordinates, the needle was moved to the lower part of the printer by moving the mechanical arm of the printer, then the needle was lowered until it contacted the surface of the printing substrate, a preset printing pattern was introduced, and printing was performed according to the preset printing pattern (FIG. 3 is an enlarged schematic view of the structure of the needle portion of a printer used in the present disclosure). When the printing was performed, as shown in FIG. 4, the mechanical arm drove the needle to do linear motion according to the pattern, so that the non-directionally arranged quantum rod solution was printed to obtain a directional arranged quantum rod film. The needle had a bore diameter of 0.05 mm, the print line spacing was 10 mm, the lowering speed during lowering the needle was 3 μm/s, the printing speed of the needle during printing was 50 μm/s, the frequency of the needle during printing was 2.1 KHz, and the printing voltage during printing was 8 V.

Figure 1:
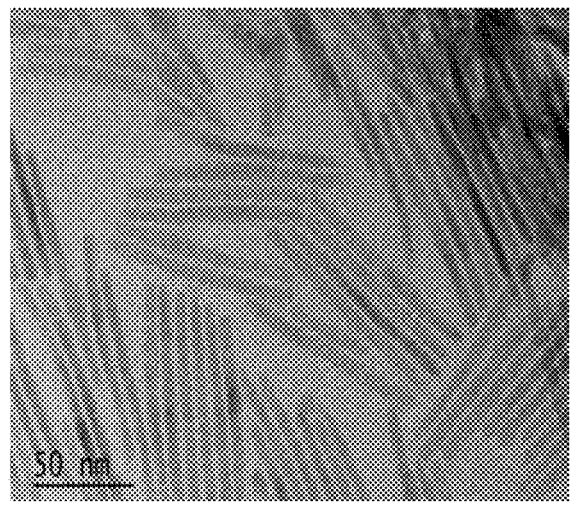
FIG. 1 is a transmission electron micrograph of the quantum rod material obtained in Example 1.

The transmission electron microscope (FEI Tecnai F30) analysis of the quantum rod material obtained in example 1 was performed, and the result was shown in FIG. 1. According to FIG. 1, the prepared material was observed to be quantum rod material through morphology, and had uniform length-to-diameter ratio.

Figure 2:
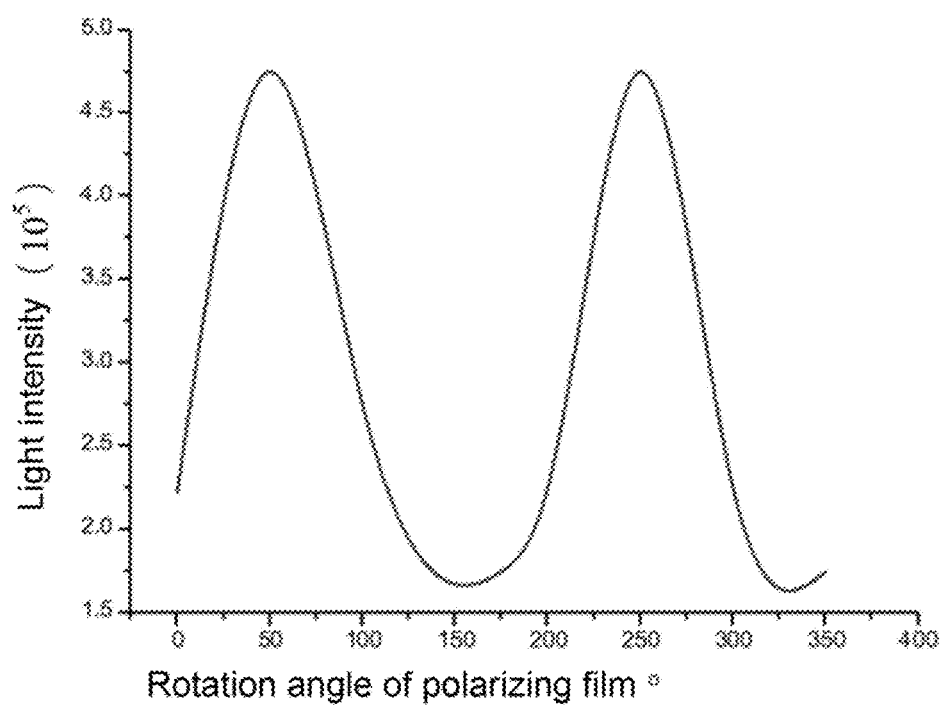
FIG. 2 is a graph showing the characterization result of the directional arrangement polarization degree of the directionally arranged quantum rod film obtained in Example 1.

FIG. 2 is a graph showing the characterization result of the directional arrangement polarization degree of the directionally arranged quantum rod film obtained in Example 1. From the result of FIG. 2, the polarization degree can be calculated according to the following formula: polarization degree=(highest peak intensity−lowest peak intensity)/(highest peak intensity+lowest peak intensity). The larger the polarization value is, the stronger the polarization effect is. According to the polarization data, the light intensity is different at different angles, and it can be seen from the highest peak and the lowest peak that there is a certain polarization effect.

The polarization degree of the directionally arranged quantum rod film prepared in this example was 0.41.

Figure 5:
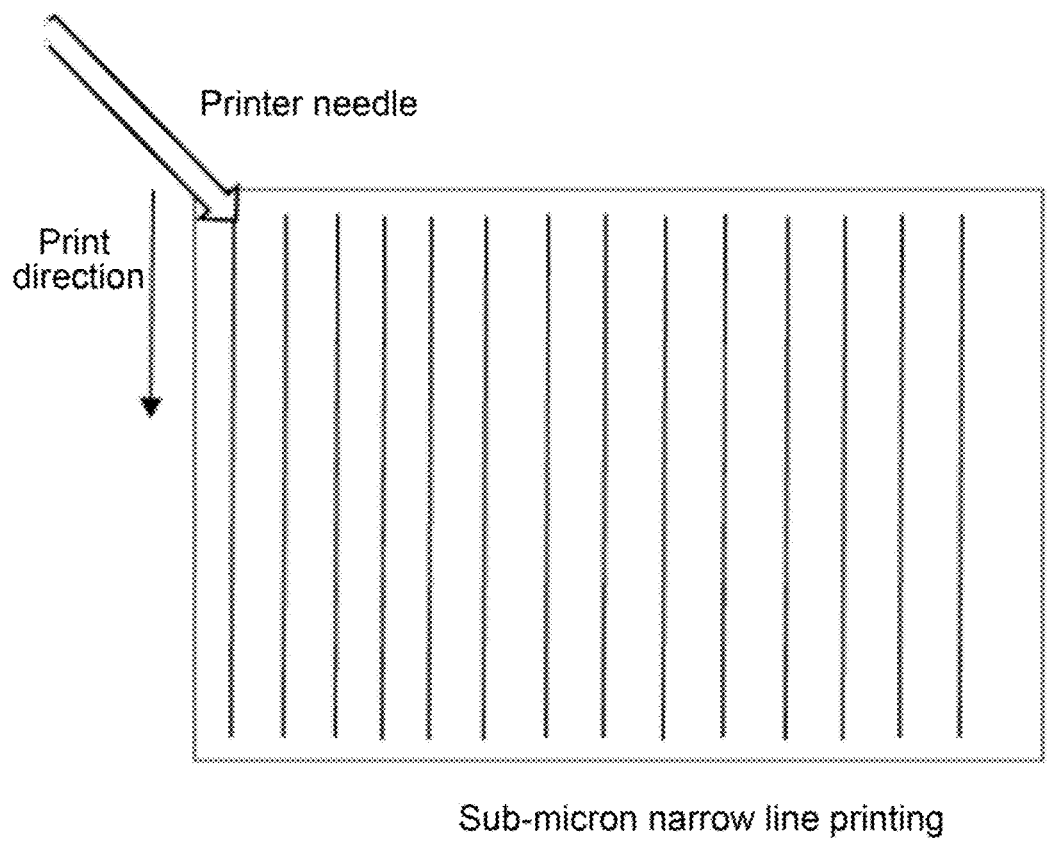
FIG. 5 is a schematic view showing the printing of a printer needle on a narrow line preset pattern during ink-jet printing according to the present disclosure.
Figure 6:
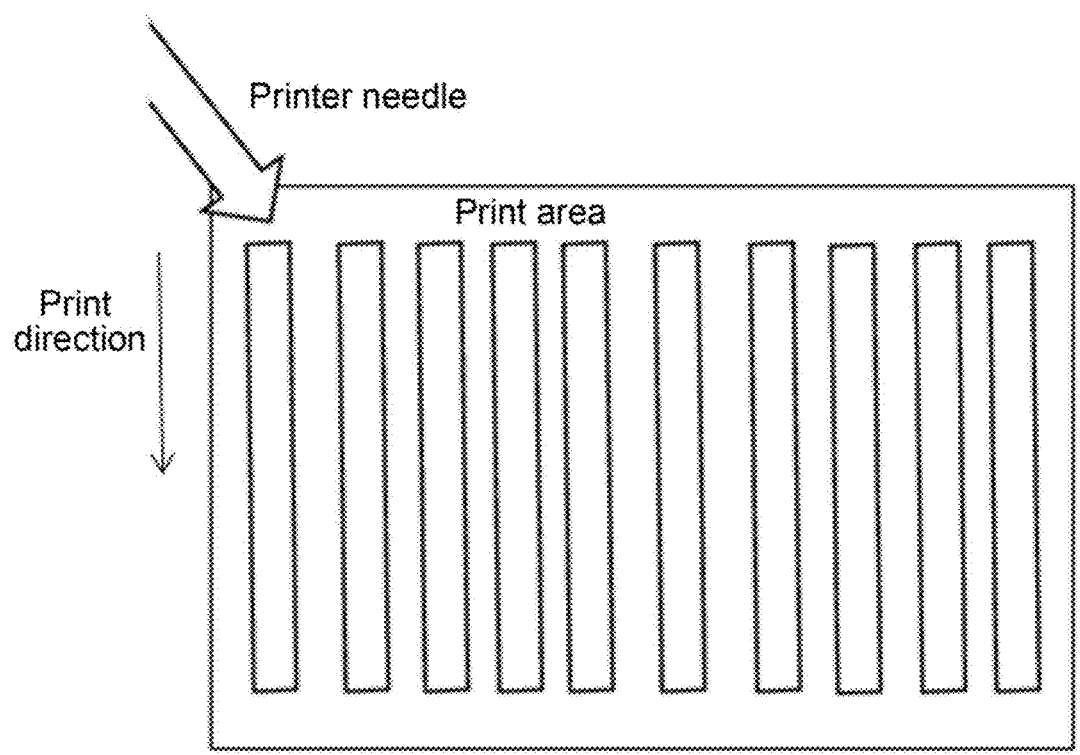
FIG. 6 is a schematic view showing the printing of a printer needle on a wide line preset pattern during ink-jet printing according to the present disclosure.

FIG. 5 is a schematic view of a printer needle printing on a narrow line preset pattern during ink-jet printing according to the present disclosure. FIG. 6 is a schematic view of a printer needle printing on a wide line preset pattern during ink-jet printing according to the present disclosure.

Example 2

In this example, a directionally arranged quantum rod film was prepared by the following method, which specifically comprises the following steps:

a red quantum rod material was prepared into a quantum-rod ink by using a mixed solvent of toluene and o-dichlorobenzene, wherein the concentration of the quantum-rod ink was 40 mg/mL; the quantum-rod ink was injected into a solution tray, an ink-jet printing needle was immersed into the quantum-rod ink in the solution tray, and the solution was sucked by the needle into the needle; the upper left corner of the ITO conductive glass substrate was selected as the origin of coordinates, the needle was moved to the lower part of the printer by moving the mechanical arm of the printer, then the needle was lowered until it contacted the surface of the printing substrate, a preset printing pattern was introduced, and printing was performed according to the preset printing pattern (FIG. 3 is an enlarged schematic view of the structure of the needle portion of a printer used in the present disclosure). When the printing was performed, as shown in FIG. 4, the mechanical arm drove the needle to do linear motion according to the pattern, so that the non-directionally arranged quantum rod solution was printed to obtain a directional arranged quantum rod film. The needle had a bore diameter of 5 mm, the print line spacing was 0 mm, the lowering speed during lowering the needle was 1 μm/s, the printing speed of the needle during printing was 5 μm/s, the frequency of the needle during printing was 2.1 KHz, and the printing voltage during printing was 0.1 V.

The polarization degree of the directionally arranged quantum rod film prepared in this example was 0.32.

Example 3

In this example, a directionally arranged quantum rod film was prepared by the following method, which specifically comprises the following steps:

a blue quantum rod material was prepared into a quantum-rod ink by using toluene, wherein the concentration of the quantum-rod ink was 10 mg/mL; the quantum-rod ink was injected into a solution tray, an ink-jet printing needle was immersed into the quantum-rod ink in the solution tray, and the solution was sucked by the needle into the needle; the upper left corner of the PET substrate was selected as the origin of coordinates, the needle was moved to the lower part of the printer by moving the mechanical arm of the printer, then the needle was lowered until it contacted the surface of the printing substrate, a preset printing pattern was introduced, and printing was performed according to the preset printing pattern (FIG. 3 is an enlarged schematic view of the structure of the needle portion of a printer used in the present disclosure). When the printing was performed, as shown in FIG. 4, the mechanical arm drove the needle to do linear motion according to the pattern, so that the non-directionally arranged quantum rod solution was printed to obtain a directional arranged quantum rod film. The needle had a bore diameter of 2 mm, the print line spacing was 20 mm, the lowering speed during lowering the needle was 3 μm/s, the printing speed of the needle during printing was 5 cm/s, the frequency of the needle during printing was 1.4 KHz, and the printing voltage during printing was 10 V.

The polarization degree of the directionally arranged quantum rod film prepared in this example was 0.28.

Example 4

In this example, a directionally arranged quantum rod film was prepared by the following method, which specifically comprises the following steps:

a green quantum rod material was prepared into a quantum-rod ink by using a mixed solvent of toluene and o-dichlorobenzene, wherein the concentration of the quantum-rod ink was 100 mg/mL, and the quantum-rod ink contained an additive which was a surfactant with a concentration of 10%; the quantum-rod ink was injected into a solution tray, an inkjet printing needle was immersed into the quantum-rod ink in the solution tray, and the solution was sucked by the needle into the needle; the upper left corner of the PET substrate was selected as the origin of coordinates, the needle was moved to the lower part of the printer by moving the mechanical arm of the printer, then the needle was lowered until it contacted the surface of the printing substrate, a preset printing pattern was introduced, and printing was performed according to the preset printing pattern (FIG. 3 is an enlarged schematic view of the structure of the needle portion of a printer used in the present disclosure). When the printing was performed, as shown in FIG. 4, the mechanical arm drove the needle to do linear motion according to the pattern, so that the non-directionally arranged quantum rod solution was printed to obtain a directional arranged quantum rod film. The needle had a bore diameter of 20 mm, the print line spacing was 50 mm, the lowering speed during lowering the needle was 5 μm/s, the printing speed of the needle during printing was 1 cm/s, the frequency of the needle during printing was 1.4 KHz, and the printing voltage during printing was 10 V.

The polarization degree of the directionally arranged quantum rod film prepared in this example was 0.33.

Example 5

In this example, a directionally arranged quantum rod film was prepared by the following method, which specifically comprises the following steps:

a green quantum rod and a red quantum rod material were prepared into a quantum-rod ink by using toluene, wherein the concentration of the quantum-rod ink was 400 mg/mL, the quantum-rod ink contained an additive with a concentration of 50%, the additive was a mixture of a surfactant, an adhesive and a humectant; the quantum-rod ink was injected into a solution tray, an ink-jet printing needle was immersed into the quantum-rod ink in the solution tray, and the solution was sucked by the needle into the needle; the upper left corner of the PMMA substrate was selected as the origin of coordinates, the needle was moved to the lower part of the printer by moving the mechanical arm of the printer, then the needle was lowered until it contacted the surface of the printing substrate, a preset printing pattern was introduced, and printing was performed according to the preset printing pattern (FIG. 3 is an enlarged schematic view of the structure of the needle portion of a printer used in the present disclosure). When the printing was performed, as shown in FIG. 4, the mechanical arm drove the needle to do linear motion according to the pattern, so that the non-directionally arranged quantum rod solution was printed to obtain a directional arranged quantum rod film. The needle had a bore diameter of 50 mm, the print line spacing was 100 mm, the lowering speed during lowering the needle was 4 μm/s, the printing speed of the needle during printing was 15 cm/s, the frequency of the needle during printing was 2.1 KHz, the printing voltage during printing was 18 V.

The polarization degree of the directionally arranged quantum rod film prepared in this example was 0.40.

Example 6

In this example, a directionally arranged quantum rod film was prepared by the following method, which specifically comprises the following steps:

a blue quantum rod and a red quantum rod material were prepared into a quantum-rod ink by using toluene, wherein the concentration of the quantum-rod ink was 2000 mg/mL, the quantum-rod ink contained an additive with a concentration of 30%, the additive was a mixture of an adhesive, a surfactant, a defoaming agent and a humectant; the quantum-rod ink was injected into a solution tray, an ink-jet printing needle was immersed into the quantum-rod ink in the solution tray, and the solution was sucked by the needle into the needle; the upper left corner of the PEN substrate was selected as the origin of coordinates, the needle was moved to the lower part of the printer by moving the mechanical arm of the printer, then the needle was lowered until it contacted the surface of the printing substrate, a preset printing pattern was introduced, and printing was performed according to the preset printing pattern (FIG. 3 is an enlarged schematic view of the structure of the needle portion of a printer used in the present disclosure). When the printing was performed, as shown in FIG. 4, the mechanical arm drove the needle to do linear motion according to the pattern, so that a directional arranged quantum rod film was obtained. The needle had a bore diameter of 100 mm, the print line spacing was 200 mm, the lowering speed during lowering the needle was 5 μm/s, the printing speed of the needle during printing was 45 cm/s, the frequency of the needle during printing was 2.1 KHz, and the printing voltage during printing was 12 V.

The polarization degree of the directionally arranged quantum rod film prepared in this example was 0.37.

The applicant declares that the present disclosure illustrates the process method of the present disclosure by way of the above examples, but the present disclosure is not limited to the above process steps, that is, it does not mean that the present disclosure must be implemented depending on the above process steps. It will be apparent to those skilled in the art that any modifications to the present disclosure, equivalent substitutions of the materials selected for the present disclosure, additions of auxiliary ingredients, selections of the specific means and the like, are all within the protection and disclosure scopes of the present disclosure.

What is claimed is:

1. A method for preparing a fluorescent polarizing film based on directional arrangement of quantum rods, wherein quantum rods are directionally arranged to prepare a fluorescent film having polarization performance, the method comprising the following steps:
   1. preparing a CdSe/CdS quantum-rod ink with a CdSe/CdS quantum rod material prepared from a core-shell coated material having CdSe as a core and CdS as a shell material; and
   2. printing the quantum-rod ink directly on a substrate according to a preset pattern by ink-jet printing to obtain a fluorescent film with the quantum rods being arranged directionally, wherein during printing, an upper left corner of the substrate is selected as an original position of the ink-jet printing, a printing needle of an ink-jet printer is lowered until it contacts surface of the printing substrate, a preset printing pattern is introduced to the printer, and the quantum-rod ink is printed on the substrate according to the preset printing pattern, obtaining a fluorescent film with the quantum rods being arranged directionally;
   wherein the method does not comprise a step of irradiating the substrate with polarized light before the printing of the quantum-rod ink or irradiating the obtained fluorescent film after the printing of the quantum-rod ink with UV light;
   wherein preparation of the CdSe/CdS quantum-rod ink comprises the following steps:
   (a) cadmium oxide (CdO), a solvent and n-hexyl phosphonic acid (HPA) are mixed, heated to a first temperature, and subjected to operation of vacuuming and replacing the atmosphere by argon gas for removal of water and oxygen, then heated to a second temperature and stirred until CdO is completely dissolved to be transparent, and tri-n-octylphosphine (TOP) is added, then a Se-TOP precursor solution is added for reaction, and the mixture is cooled to obtain a CdSe core solution:
(b) the CdSe core solution obtained in step (a) is purified and dispersed into TOP to form a CdSe-TOP solution;
(c) CdO, the solvent, HPA and tetradecyl phosphonic acid (TDPA) are mixed, heated to a first temperature, and subjected to operation of vacuuming and replacing the atmosphere by argon gas for removal of water and oxygen, then heated to a second temperature and stirred until CdO is completely dissolved to be transparent, and TOP is added, then a S-TOP solution and the CdSe-TOP solution obtained in step (b) are added for reaction, and the mixture is cooled to obtain a CdSe/CdS quantum rod solution;
(d) the CdSe/CdS quantum rod solution is purified, the solvent and an additive are added, and a quantum-rod ink with proper viscosity and surface tension is prepared according to actual application conditions;
wherein the solvent of the quantum-rod ink is selected from the group consisting of toluene, o-dichlorobenzene, dimethylacetamide, 3,4-dimethylanisole, chloroform, chlorobenzene, xylene, benzene, n-hexane, cyclohexane, n-heptane, octane, decane, undecane, dodecane, n-tetradecane, hexadecane and n-octadecane, and a combination thereof; and
when the printing is performed, the printing needle does linear motion according to the pattern.

2. The preparation method according to claim 1, wherein the quantum rods of the quantum-rod ink are any one selected from the group consisting of red quantum rods, green quantum rods and blue quantum rods, or a combination of at least two selected therefrom.

3. The preparation method according to claim 2, wherein the quantum rod material for preparing the quantum-rod ink is a single-core material and/or a core-shell coated material.

4. The preparation method according to claim 3, wherein the quantum rod material for preparing the quantum-rod ink is a core-shell coated material.

5. The preparation method according to claim 3, wherein the single-core material is any one selected from the group consisting of cadmium selenide, cadmium telluride, cadmium sulfide, zinc selenide, copper indium sulfide, indium phosphide, zinc copper selenide and manganese zinc selenide, or a combination of at least two selected therefrom.

6. The preparation method according to claim 3, wherein the core-shell coated material has the single-core material as a core thereof, and a shell layer material selected from the group consisting of cadmium sulfide, zinc oxide, zinc sulfide, zinc selenide and zinc telluride, or a combination of at least two selected therefrom.

7. The preparation method according to claim 1, wherein the quantum rod material for preparing the quantum-rod ink is a CdSe/CdS quantum rod material prepared from a core-shell coated material having CdSe as a core and CdS as a shell material.

8. The preparation method according to claim 1, wherein the quantum-rod ink comprises 0.2-2000 mg of the CdSe/CdS quantum rod material per mL of the quantum-rod ink.

9. The preparation method according to claim 1, wherein the quantum-rod ink further comprises an additive.

10. The preparation method according to claim 9, wherein the additive is any one selected from the group consisting of an adhesive, a surfactant, a defoaming agent and a humectant, or a combination of at least two selected therefrom.

11. The preparation method according to claim 9, wherein the concentration of the additive in the quantum-rod ink is 0-50%.

12. The preparation method according to claim 1, wherein before printing, the quantum-rod ink is injected into a solution tray, the printing needle is immersed into the quantum-rod ink in the solution tray, and the solution is sucked the printing needle.

13. The preparation method according to claim 1, wherein the substrate is any one selected from the group consisting of a common glass, an ITO conductive glass and a polymer substrate.

14. The preparation method according to claim 13, wherein the substrate is a PET substrate, a PEN substrate, or a PMMA substrate.

15. The preparation method according to claim 1, wherein the printing needle has a bore diameter of 0.05 mm-100 mm.

16. The preparation method according to claim 1, wherein a printing line in the preset pattern has a width greater than or equal to the bore diameter of the printing needle.

17. The preparation method according to claim 1, wherein to print line spacing is 0-200 mm.

18. The preparation method according to claim 1, wherein a lowering speed during lowering of the printing needle is 1-5 μm/s;
a printing speed of the printing needle during printing is above 5 μm/s;
a frequency of the printing needle during printing is 1.4-2.1 KHz; and
a printing voltage during printing is 0.1-18 V.

19. The preparation method according to claim 1, wherein the quantum rods are selected from a group consisting of red quantum rods, green quantum rods, blue quantum rods, and a combination thereof.

* * * * *